United States Patent
Wei et al.

(10) Patent No.: US 11,937,333 B2
(45) Date of Patent: Mar. 19, 2024

(54) DEVICES AND METHODS FOR WIRELESS COMMUNICATION

(71) Applicant: 5G IP Holdings LLC, Dallas, TX (US)

(72) Inventors: Chia-Hung Wei, Taipei (TW); Mei-Ju Shih, Taipei (TW)

(73) Assignee: 5G IP Holdings LLC

( * ) Notice: Subject to any disclaimer, the term of this patent is extended or adjusted under 35 U.S.C. 154(b) by 0 days.

(21) Appl. No.: 17/874,287

(22) Filed: Jul. 27, 2022

(65) Prior Publication Data

US 2022/0361285 A1    Nov. 10, 2022

Related U.S. Application Data (63) Continuation of application No. 17/023,167, filed on Sep. 16, 2020, now Pat. No. 11,425,783, which is a continuation of application No. 16/145,583, filed on Sep. 28, 2018, now Pat. No. 10,813,163.

(60) Provisional application No. 62/564,650, filed on Sep. 28, 2017.

(51) Int. Cl.
    *H04W 76/28*    (2018.01)
    *H04W 72/23*    (2023.01)

(52) U.S. Cl.
    CPC .......... *H04W 76/28* (2018.02); *H04W 72/23* (2023.01)

(58) Field of Classification Search
    CPC ... H04W 76/28; H04W 72/23; H04W 72/042; H04W 72/0446; H04W 72/1289; Y02D 30/70

See application file for complete search history.

(56) References Cited

U.S. PATENT DOCUMENTS

| | | | |
|---|---|---|---|
| 2015/0071089 A1 | 3/2015 | Lin et al. | |
| 2016/0366722 A1* | 12/2016 | Heo | H04W 28/0221 |
| 2020/0245395 A1* | 7/2020 | Zhang | H04L 5/0053 |
| 2020/0252180 A1* | 8/2020 | Takeda | H04W 72/12 |
| 2021/0143953 A1* | 5/2021 | Parkvall | H04W 72/1273 |
| 2021/0314114 A1* | 10/2021 | Seo | H04L 1/0071 |

FOREIGN PATENT DOCUMENTS

| | | |
|---|---|---|
| CN | 105122717 A | 12/2015 |
| CN | 105340341 A | 2/2016 |
| CN | 105472535 A | 4/2016 |

OTHER PUBLICATIONS

U.S. Appl. No. 62/505,553, Specification, filed May 12, 2017 (Year: 2017).*

(Continued)

*Primary Examiner* — Chi H Pham
*Assistant Examiner* — Ji-Hae Yea
(74) *Attorney, Agent, or Firm* — ScienBiziP, P.C.

(57) ABSTRACT

A method, a communication apparatus using the method, and a base station apparatus are disclosed. The method includes arranging user equipment to receive a downlink control channel signal associated with a physical downlink control channel; and configuring the user equipment to monitor the physical downlink control channel for control-resource set information. The control-resource set information corresponds to time and frequency resource allocation information related to the physical downlink control channel. The control-resource set information includes at least one parameter.

20 Claims, 9 Drawing Sheets

(56) References Cited

OTHER PUBLICATIONS

U.S. Appl. No. 62/564,208,Specification, filed Feb. 27, 2020 (Year: 2020).*
U.S. Appl. No. 62/564,208,Specification_-_Not_in_English, filed Sep. 27, 2017 (Year: 2017).*
U.S. Appl. No. 62/543,755,Specification, filed Aug. 10, 2017 (Year: 2017).*
NTT DOCOMO, Inc., R2-1702222, Introduction of data inactivity timer, 3GPP TSG-RAN WG2 Meeting #97 (Feb. 20, 2017).
Sony, R1-1710865, Remaining issues on using pre-emption indicator for DL URLLC/eMBB multiplexing, 3GPP TSG RAN WG1 NR Ad-Hoc#2 (Jun. 17, 2017).
InterDigital Inc., R2-1704913, C-DRX for Multiple Numerologies, 3GPP TSG RAN WG2 #98, 3GPP (May 6, 2017).
InterDigital Inc., R2-1708723, Timing Aspects in MAC, 3GPP TSG RAN WG2 #99, 3GPP (Aug. 11, 2017).
3GPP, TS38.213 v1.0.0, NR; Physical layer procedures for control (Release 15), 3GPP (Sep. 7, 2017).

* cited by examiner

DEVICES AND METHODS FOR WIRELESS COMMUNICATION

CROSS-REFERENCE TO RELATED APPLICATION(S)

This application is a continuation application of U.S. Non-Provisional patent application Ser. No. 17/023,167, filed on Sep. 16, 2020, which is a continuation application of U.S. Non-Provisional patent application Ser. No. 16/145,583, filed on Sep. 28, 2018, which claims the benefit of and priority to U.S. Provisional Patent Application Ser. No. 62/564,650, filed on Sep. 28, 2017. The contents of all of the above-mentioned applications are hereby incorporated fully by reference into the present disclosure.

FIELD

The present disclosure generally relates to wireless communication.

BACKGROUND

In a wireless communication network, such as a Long-Term Evolution (LTE) or an evolved LTE (eLTE) network, discontinuous reception (DRX) is commonly used between a base station and one or more user equipments (UEs) to preserve battery life of the UEs. For example, during DRX, a UE may switch off its RF module and/or suspend control channel monitoring between data transmissions to reduce power consumption. The UE may periodically monitor the control channel (e.g., a physical downlink control channel (PDCCH)) with preconfigured ON/OFF cycles based on, for example, the base station's configuration and real traffic pattern. During active time (e.g., ON cycles), the UE monitors PDCCH for possible data transmission/reception indication. When data transmission occurs during the active time, the UE may stay active to finish the transmission.

In order to increase flexibility on data scheduling in the next-generation (e.g., fifth-generation (5G) New Radio (NR)) wireless communication networks, the Third Generation Partnership Project (3GPP) has introduced new designs on forming frame structures and allocating control channels, where not all elements in a frame structure will have a fixed time unit.

Thus, there is a need in the art for devices and methods for controlling DRX operation for the next generation wireless communication networks.

SUMMARY

The present disclosure is directed to devices and methods for wireless communication.

In a first aspect of the present disclosure, a method is provided. The method includes arranging user equipment to receive a downlink control channel signal associated with a physical downlink control channel; and configuring the user equipment to monitor the physical downlink control channel for control-resource set information. The control-resource set information corresponds to time and frequency resource allocation information related to the physical downlink control channel. The control resource set information includes at least one parameter.

In a second aspect of the present disclosure, a communication apparatus is provided. The communication apparatus includes a receiver configured to receive a physical downlink control channel signal; and a device configured to monitor the physical downlink control channel signal to detect control-resource set information. The control-resource set information includes at least one parameter and corresponds to time and frequency resource allocation information.

In a third aspect of the present disclosure, a base station apparatus is provided. The base station apparatus includes a transmitter configured to transmit a physical downlink control channel signal including control-resource set information. The control-resource set information includes at least one parameter and corresponds to time and frequency resource allocation information.

BRIEF DESCRIPTION OF THE DRAWINGS

Aspects of the exemplary disclosure are best understood from the following detailed description when read with the accompanying figures. Various features are not drawn to scale, dimensions of various features may be arbitrarily increased or reduced for clarity of discussion.

DESCRIPTION

The following description contains specific information pertaining to exemplary implementations in the present disclosure. The drawings in the present disclosure and their accompanying detailed description are directed to merely exemplary implementations. However, the present disclosure is not limited to merely these exemplary implementations. Other variations and implementations of the present disclosure will occur to those skilled in the art. Unless noted otherwise, like or corresponding elements among the figures may be indicated by like or corresponding reference numerals. Moreover, the drawings and illustrations in the present disclosure are generally not to scale and are not intended to correspond to actual relative dimensions.

For the purpose of consistency and ease of understanding, like features are identified (although, in some examples, not shown) by numerals in the exemplary figures. However, the features in different implementations may be different in other respects, and thus shall not be narrowly confined to what is shown in the figures.

The description uses the phrases "in one implementation," or "in some implementations," which may each refer to one or more of the same or different implementations. The term "coupled" is defined as connected, whether directly or indirectly through intervening components, and is not necessarily limited to physical connections. The term "comprising," when utilized, means "including, but not necessarily limited to"; it specifically indicates open-ended inclusion or membership in the so-described combination, group, series and the equivalent.

Additionally, for the purposes of explanation and non-limitation, specific details, such as functional entities, techniques, protocols, standard, and the like are set forth for providing an understanding of the described technology. In other examples, detailed description of well-known methods, technologies, system, architectures, and the like are omitted so as not to obscure the description with unnecessary details.

Persons skilled in the art will immediately recognize that any network function(s) or algorithm(s) described in the present disclosure may be implemented by hardware, software, or a combination of software and hardware. Described functions may correspond to modules, software, hardware, firmware, or any combination thereof. The software implementation may comprise computer executable instructions stored on computer readable medium, such as memory or other type of storage devices. For example, one or more microprocessors or general-purpose computers with communication processing capability may be programmed with corresponding executable instructions and carry out the described network function(s) or algorithm(s). The microprocessors or general-purpose computers may be formed of application-specific integrated circuits (ASIC), programmable logic arrays, and/or one or more digital signal processor (DSPs). Although some of the exemplary implementations described in this specification are oriented to software installed and executing on computer hardware, nevertheless, alternative exemplary implementations implemented as firmware or as hardware or combination of hardware and software are well within the scope of the present disclosure.

The computer readable medium includes but is not limited to random-access memory (RAM), read-only memory (ROM), erasable programmable read-only memory (EPROM), electrically erasable programmable read-only memory (EEPROM), flash memory, compact disc read-only memory (CD ROM), magnetic cassettes, magnetic tape, magnetic disk storage, or any other equivalent medium capable of storing computer-readable instructions.

A radio communication network architecture (e.g., a Long-Term Evolution (LTE) system, an LTE-Advanced (LTE-A) system, or an LTE-Advanced Pro system) typically includes at least one base station, at least one user equipment (UE), and one or more optional network elements that provide connection towards a network. The UE communicates with the network (e.g., a core network (CN), an evolved packet core (EPC) network, an Evolved Universal Terrestrial Radio Access network (E-UTRAN), a Next-Generation Core (NGC), 5G Core Network (5GC), or an internet) through a radio access network (RAN) established by the base station.

It should be noted that, in the present application, a UE may include, but is not limited to, a mobile station, a mobile terminal or device, or a user communication radio terminal. For example, a UE may be a portable radio equipment, which includes, but is not limited to, a mobile phone, a tablet, a wearable device, a sensor, or a personal digital assistant (PDA) with wireless communication capability. The UE is configured to receive and transmit signals over an air interface to one or more cells in a radio access network.

A base station may include, but is not limited to, a node B (NB) as in the Universal Mobile Telecommunication System (UMTS), an evolved node B (eNB) as in the LTE-A, a radio network controller (RNC) as in the UMTS, a base station controller (BSC) as in the Global System for Mobile communications (GSM)/GSM EDGE radio access Network (GERAN) (GSM/GERAN), an NG-eNB as in an E-UTRA base station in connection with the 5GC, a next generation node B (gNB) as in the 5G-RAN, and any other apparatus capable of controlling radio communication and managing radio resources within a cell. The base station may connect to serve the one or more UEs through a radio interface to the network.

A base station may be configured to provide communication services according to at least one of the following radio access technologies (RATs): Worldwide Interoperability for Microwave Access (WiMAX), GSM (often referred to as 2G), GERAN, General Packet Radio Service (GPRS), UMTS (often referred to as 3G) based on basic wideband-code division multiple access (W-CDMA), high-speed packet access (HSPA), LTE, LTE-A, eLTE (evolved LTE), New Radio (NR, often referred to as 5G), and/or LTE-A Pro. However, the scope of the present application should not be limited to the above-mentioned protocols.

The base station is operable to provide radio coverage to a specific geographical area using a plurality of cells forming the radio access network. The base station supports the operations of the cells. Each cell is operable to provide services to at least one UE within radio coverage of the cell. More specifically, each cell (often referred to as a serving cell) provides services to serve one or more UEs within the cell's radio coverage, (e.g., each cell schedules the downlink and optionally uplink resources to at least one UE within the cell's radio coverage for downlink and optionally uplink packet transmissions). The base station can communicate with one or more UEs in the radio communication system through the plurality of cells. A cell may allocate sidelink (SL) resources for supporting proximity service (ProSe). Each cell may have overlapped coverage areas with other cells.

As discussed above, the frame structure for the next generation (e.g., 5G NR) wireless communication networks is to support flexible configurations for accommodating various next-generation communication requirements, such as enhanced Mobile Broadband (eMBB), massive Machine Type Communications (mMTC), and Ultra Reliable Low Latency Communications (URLLC), while fulfilling high reliability, high data rate, and low latency requirements. The orthogonal frequency-division multiplexing (OFDM) technology as agreed in 3GPP may serve as a baseline for NR waveform. The scalable OFDM numerology, such as the adaptive sub-carrier spacing, the channel bandwidth, and the Cyclic Prefix (CP) may be also used. Additionally, two coding schemes are considered for NR: (1) low-density parity-check (LDPC) code and (2) Polar Code. The coding scheme adaption may be configured based on the channel conditions and/or the service applications.

Moreover, it is also considered that in a transmission time interval TX of a single NR frame, a downlink (DL) transmission data, a guard period, and an uplink (UL) transmission data should at least be included, where the respective portions of the DL transmission data, the guard period, and the UL transmission data should also be configurable, for example, based on the network dynamics of NR. In addition, sidelink resource may also be provided in an NR frame to support ProSe services.

In Long-Term Evolution (LTE) wireless communication systems, during DRX operation, a UE's Medium Access Control (MAC) entity may be configured by Radio Resource Control (RRC) with a DRX functionality that controls the UE's Physical Downlink Control Channel (PDCCH) monitoring activities for the MAC entity's Common-Radio Network Temporary Identifier (C-RNTI), transmit power control Physical Uplink Control Channel (PUCCI) Radio Network Temporary Identifier (TPC-PUCCH-RNTI), transmit power control Physical Uplink Shared Channel (PUSCH) Radio Network Temporary Identifier (TPC-PUSCH-RNTI), Semi-Persistent Scheduling C-RNTI (if configured), uplink (UL) Semi-Persistent Scheduling Virtual-RNTI (V-RNTI)(if configured), enhanced interference mitigation with traffic adaptation-RNTI (eIMTA-RNTI)(if configured), sidelink-RNTI (S-RNTI)(if configured), SL-V-RNTI (if configured), Component Carrier-RNTI (CC-RNTI) (if configured), and Sounding Reference Signal (SRS)-TPC-RNT/(SRS-TPC-RN77) (if configured). When in the RRC_CONNECTED state, if DRX is configured, the MAC entity is allowed to monitor the PDCCH discontinuously using DRX operation. The RRC controls the DRX operation by configuring one or more of the following timers and parameters: DRX On Duration Timer (onDurationTimer), DRX Inactivity Timer (drx-InactivityTimer), DRX Retransmission Timer (drx-RetransmisionTimer), DRX UL Retransmission Timer (e.g., drx-ULRetransmissionTimer), DRX Long Cycle (longDRX-Cycle), DRX Start Offset (drxStartOffset), DRX Short Cycle (shortDRX-Cycle), and DRX Short Cycle Timer (drxShortCycleTimer), as listed in Table I. Based on the DRX configuration provided by the base station (e.g., an evolved NodeB (eNB)), the UE is configured with the exact active time. When a DRX cycle is configured, the Active Time includes time indicated by the ON Duration Timer, the DRX Inactivity Timer, the DRX Retransmission Timer, the DRX UL Retransmission Timer, and/or a MAC-Contention Resolution Timer.

Implementations of the present application focus on the ON Duration Timer and the DRX Inactivity Timer. According to the purposes and usages addressed in the present application, these parameters can be categorized into four aspects: DRX Cycle, Data Transmission, Data Retransmission, and Hybrid Automatic Repeat reQuest (HARQ). In addition, these parameters may have different time units. For example, the parameters related to DRX Cycle and HARQ are configured with time units in subframe (sf), and the parameters related to Data Transmission and Data Retransmission are configured with PDCCH subframe (psf).

TABLE I

List of parameters in DRX

| Purpose | Parameters | Time Unit |
|---|---|---|
| DRX Cycle | shortDRX-Cycle | sf |
| | longDRX-Cycle | sf |
| | drxStartOffset | sf |
| Data Transmission | onDurationTimer | psf |
| | drx-InactivityTimer | psf |
| Data Retransmission | drx-RetransmissionTimer | psf |
| | drx-ULRetransmissionTimer | psf |
| HARQ | HARQ RTT timer | sf |
| | UL HARQ RTT timer | sf |

In the next generation (e.g., 5G NR) wireless communication networks, there are at least three different types of time units: Fixed time unit (FTU), Scalable time unit (STU), and Absolute time (AT). For example, subframes, frames, and hyper-frames are FTUs, while slots and symbols are STUs. The subframes, frames, and hyper-frames are each configured with a fixed length of time, for example, 1 ms, 10 ms, and 10240 ms. Different from LTE, the slot length in the next generation (e.g., 5G NR) wireless communication networks is not static due to the differences in symbol lengths. As symbol length is inversely proportional to sub-carrier spacing (SCS), the number of slots within a subframe may vary depending on, for example, SCS.

In a 5G NR wireless communication network, two different scheduling mechanisms, slot-based scheduling and non-slot-based scheduling, are supported. For slot-based scheduling, since each slot includes a PDCCH occasion, a base station (e.g., gNB) may perform data scheduling on a per-slot basis. In other words, the shortest time interval between two data scheduling can be a slot in 5G NR wireless communication networks, which has a smaller time granularity than a subframe in LTE wireless communication networks. For a non-slot-based scheduling mechanism, the data scheduling is not bundled with slots. The UE is to be configured with a UE-specific control resource set (CORESET) configuration which may include time and frequency resource allocation information that the UE needs to monitor. The CORESET configuration also includes a CORESET monitor periodicity. The CORESET monitor periodicity can be in symbol(s). Hence, the base station (e.g., an eNB or a gNB) may perform more than one data scheduling within one slot and may also have a smaller time granularity than slot-based scheduling. In slot-based scheduling, the UE also can be configured with a CORESET configuration which indicates time and frequency resource allocation information that the UE needs to monitor within the PDCCH in each slot.

Furthermore, in 5G NR wireless communication networks, the DRX parameters may be configured with different time units (e.g., FTU, STU, or AT). For example, the DRX Short Cycle Timer (drx-ShortCycleTimer), the DRX Long Cycle (drx-LongCycle), the DRX ON Duration Timer (drx-onDurationTimer), and the DRX Inactivity Timer (drx-InactivityTimer) may be configured by AT (e.g., ms). Hence, the DRX operation, in 5G NR wireless communication networks, is more flexible than the DRX operation in LTE wireless communication networks. For example, in LTE networks, the DRX Inactivity Timer may be triggered after a subframe in which a PDCCH indicates an initial uplink, downlink, or sidelink user data transmission. As indicated in Table 1, the DRX Inactivity Timer is configured with psf. In 5G NR networks, the DRX Inactivity Timer may be configured by milliseconds (ms). Hence, detailed behaviors of the DRX operation need to be adjusted accordingly. For example, the starting time and/or expiration time of the short DRX Cycle, the long DRX Cycle, the ON Duration Timer, and the DRX Inactivity Timer need to be addressed.

In LTE networks, the ON Duration Timer will be triggered when one of the two following formulas is satisfied:

Short DRX Cycle is used and [(SFN*10)+subframe number] modulo (shortDRX-Cycle)=(drxStartOffset) modulo (shortDRX-Cycle)    (1)

Long DRX Cycle is used and [(SFN*10)+subframe number] modulo (longDRX-Cycle)=drxStartOffset    (2)

where SFN is a system frame number.

Since the ON Duration Timer is configured by psf, the starting time of the ON Duration Timer is at the beginning of a subframe (since each subframe includes a PDCCH) when the ON Duration Timer is triggered. However, the ON Duration Timer in 5G NR networks is configured by ms, and the actual starting time of the ON Duration Timer may have several possible starting positions.

Implementations of the present application address the starting time and the ending time of each of the short DRX Cycle, the long DRX Cycle, the ON Duration Timer, and the DRX Inactivity Timer in 5G NR networks.

In 5G NR networks, there are ten subframes per system frame, $N_{slot}^{sf}$ slots per subframe, and $N_{symbol}^{slot}$ symbols per slot. In other words, there are $N_{symbol}^{slot} * N_{slot}^{sf}$ symbols per subframe, and $10 * N_{symbol}^{slot} * N_{slot}^{sf}$ symbols per system frame.

Figure 1:
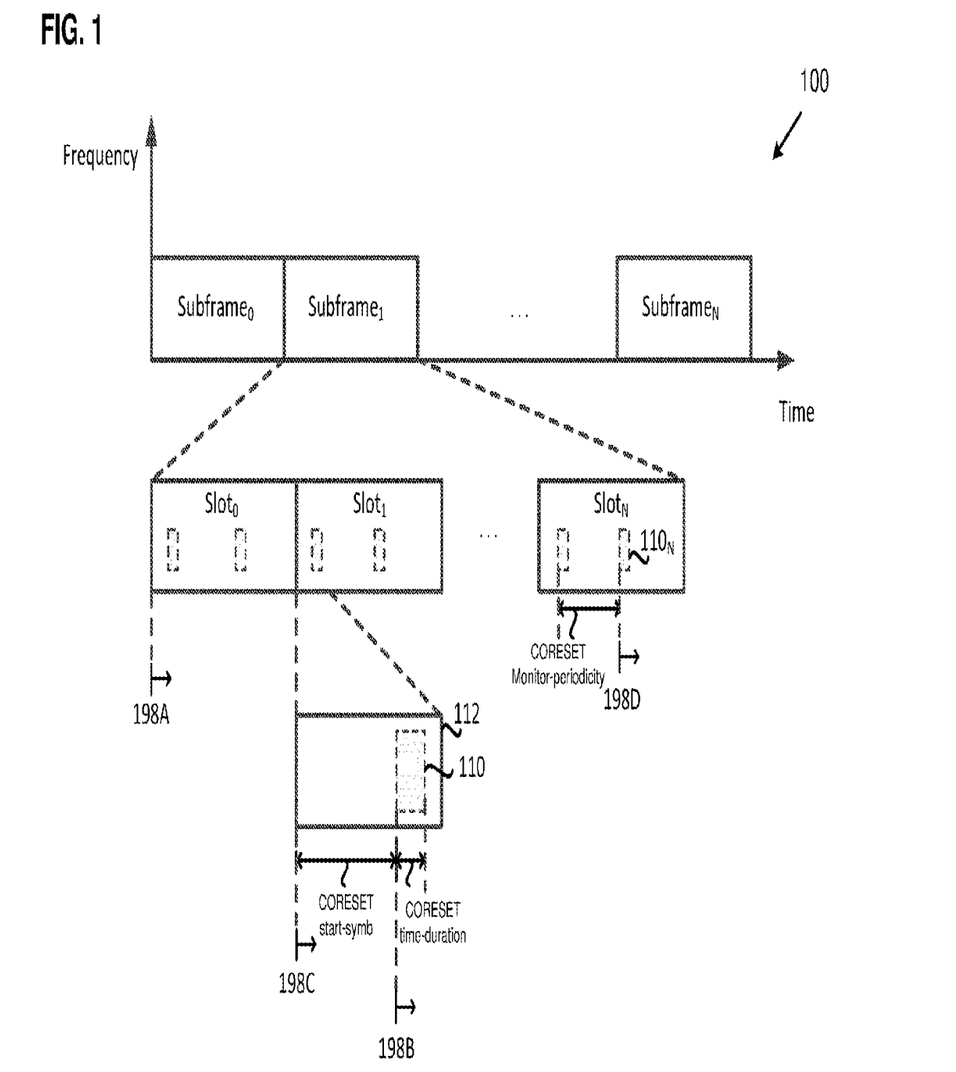
FIG. 1 is a diagram illustrating a frame structure showing various ON Duration Timer starting time positions, according to example implementations of the present application.

Referring to FIG. 1, a UE may be configured with a CORESET configuration that includes several parameters for indicating the location(s) of the CORESET. For example, the CORESET configuration includes a starting symbol for the CORESET (CORESET-start-symb) and the continuous time duration of the CORESET (CORESET-time-duration). Table II includes the abbreviations and descriptions of the parameters used in the present application.

TABLE II

Abbreviations of parameters

| Abbreviation | Description |
| --- | --- |
| STU | Scalable Time Unit; For example, slot and symbol are the STU. |
| FTU | Fixed Time Unit; For example, subframe, frame and hyper-frame. |
| $N_{symbol}^{slot}$ | Number of symbols per slot configured by gNB |
| $N_{slot}^{sf}$ | Number of slots per subframe configured by gNB |
| $T_{symbol}$ | Length of a symbol in ms configured by gNB |
| CORESET-start-symb | Starting symbol for the CORESET; counting from the front edge of each slot (as shown in FIG. 1) |
| CORESET-time-duration | Continuous time duration of the CORESET |
| CORESET-Monitor-periodicity | Time interval between CORESETs the UE is configured to monitor |
| $T_{IA}^{INT}$ | Length of DRX Inactivity Timer; Configured with an integer value number in ms |
| $T_{OD}^{INT}$ | Length of ON Duration Timer; Configured with an integer value number in ms |
| $T_{IA}^{FLT}$ | Length of DRX Inactivity Timer; Configured with a floating value number in ms; It can be a length of multiple symbols or slots. |
| $T_{OD}^{FLT}$ | Length of ON Duration Timer; Configured with a floating value number in ms; It can be a length of multiple symbols or slots. |

In 5G NR wireless communication network, during DRX operation, a base station (e.g., a gNB) may provide DRX configuration having one or more of the following timers and parameters: DRX On Duration Timer (drx-onDurationTimer), DRX Inactivity Timer (drx-InactivityTimer), DRX Retransmission Timer (drx-RetransmissionTimerDL), DRX UL Retransmission Timer (drx-RetransmissionTimerDL), DRX Long Cycle (drx-LongCycle), DRX Start Offset (drx-StartOffset), DRX Short Cycle (drx-ShortCycle), DRX Short Cycle Timer (drx-ShortCycleTimer), DRX Slot Offset (drxStartOffset_slot), DRX DL HARQ RTT Timer (drx-HARQ-RTT-TimerDL), and DRX UL HARQ RTT Timer (drx-HARQ-RTT-TimerUL).

CASE 1: ON Duration Timer Starting Time

FIG. 1 is a diagram illustrating a frame structure showing various ON Duration Timer starting time positions, according to example implementations of the present application.

In one implementation, the ON Duration Timer may start at the beginning of a subframe. In diagram 100, the ON Duration Timer may start at position 198A, which is at the beginning of subframe$_1$. In this implementation, no additional parameter is required to be signaled to the UE.

In one implementation, the ON Duration Timer may start at the beginning of a CORESET, which is applied for slot-based scheduling. In diagram 100, the ON Duration Timer may start at position 198B, which is at the beginning of CORESET 110. In this implementation, the ON Duration Timer may start when at least one of the two following formulas is satisfied:

Short DRX Cycle is used and [(SFN*10)+subframe number] modulo (drx-ShortCycle)=(drx-StartOffset) modulo (drx-ShortCycle) and slot number=drxStartOffset_slot and symbol number=CORESET-start-symb;  (1)

Long DRX Cycle is used and [(SFN*10)+subframe number] modulo (drx-LongCycle)=drx-StartOffset and slot number=drxStartOffset_slot and symbol number=CORESET-start-symb;  (2)

where drx-StartOffset is the same as drxStartOffset in LTE, and drxStartOffset_slot is an offset in a slot configured by gNB via RRC message(s). Under this implementation, the start of ON Duration Timer can be implicitly signaled by CORESET configuration and the starting time of ON Duration Timer may be variable based on CORESET re-configuration.

In one implementation, the ON Duration Timer may start at the beginning of a slot. In diagram 100, the ON Duration Timer may start at position 198C, which is at the beginning of slot$_1$ of subframe$_1$. In this implementation, the ON Duration Timer may start when at least one of the two following formulas is satisfied:

Short DRX Cycle is used and [(SFN*10)+subframe number] modulo (drx-ShortCycle)=(drx-StartOffset) modulo (drx-ShortCycle) and slot number drxStartOffset_slot  (1)

Long DRX Cycle is used and [(SFN*10)+subframe number] modulo (drx-LongCycle)=drx-StartOffset and slot number=drxStartOffset_slot  (2)

where drx-StartOffset is the same as drxStartOffset in LTE, and drxStartOffset_slot is an offset in a slot configured by the base station (e.g., an eNB or a gNB) via RRC message(s).

In one implementation, the ON Duration Timer may start at the beginning of a CORESET that is applied for non-slot-based scheduling. In diagram 100, the ON Duration Timer may start at position 198D, which is at the beginning of CORESET 110$_N$ of slot$_N$. In this implementation, the ON Duration Timer may start when at least one of the following formulas is satisfied:

(1) Short DRX Cycle is used and [(SFN*10)+subframe number] modulo (drx-ShortCycle)=(drx-StartOffset) modulo (drx-ShortCycle) and slot number=drxStartOffset_slot and symbol number (CORESET-start-symb+$n$*CORESET-Monitor-periodicity);

Long DRX Cycle is used and [(SFN*10)+subframe number] modulo (drx-LongCycle)=drx-StartOffset and slot number=drxStartOffset_slot and symbol number=(CORESET-start-symb+ $n$*CORESET-Monitor-periodicity);  (2)

where drx-StartOffset is the same as drxStartOffset in LTE. drxStartOffset_slot is an offset in a slot and n is a CORESET numbering within a slot. Both drxStartOffset_slot and n are configured by the base station (e.g., an eNB or a gNB) via RRC message(s).

In some implementations, the UE may automatically cancel/suspend DRX operation when multiple CORESETs are configured, as power saving may not be the main concern in this situation. In some implementations, a per-UE ON Duration Timer may be configured and may keep running regardless of which CORESET configuration and its corresponding PDSCH, and the ON Duration Timer is to stop when it expires. In some implementations, a per-CORESET ON Duration Timer may be configured, where each CORESET may be associated with an ON Duration Timer, and the UE is allowed to sleep when all of ON Duration Timers are stopped.

CASE 2: DRX Inactivity Timer Starting Time

A DRX Inactivity Timer may start after a PDCCH indicates an initial uplink, downlink, or sidelink user data transmission for the UE. In light of the flexible CORESET configurations, 5G NR wireless communication networks may support both slot-based and non-slot-based scheduling. Hence, the actual starting time of the DRX Inactivity Timer may be related to a DCI/UCI (Uplink control information) within a CORESET indicating data transmission/reception.

Figure 2:
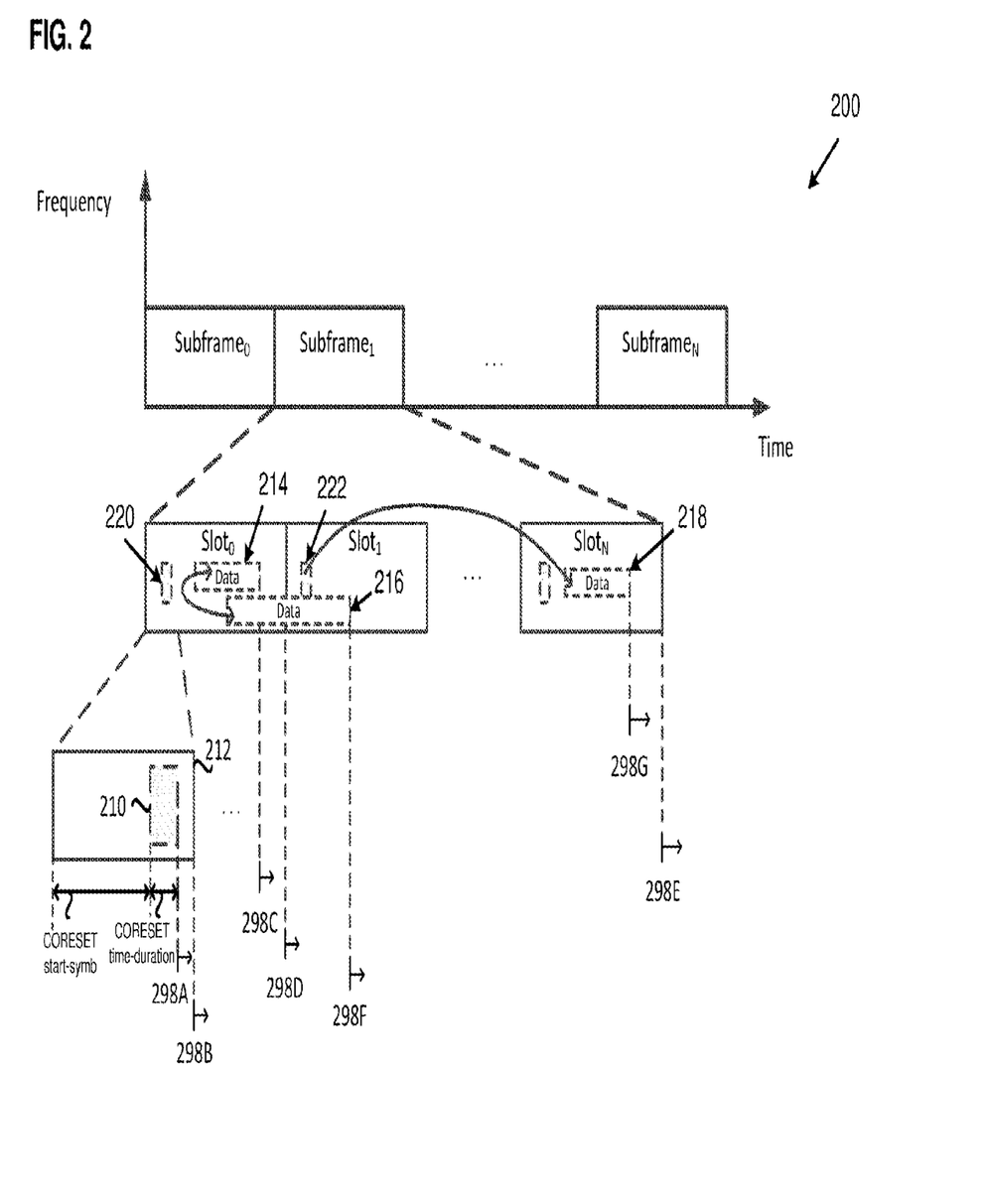
FIG. 2 is a diagram illustrating a frame structure with data scheduling and showing various DRX Inactive Timer starting time positions, according to example implementations of the present application.

FIG. 2 is a diagram illustrating a frame structure with data scheduling and showing various DRX Inactive Timer starting time positions, according to example implementations of the present application.

In one implementation, the DRX Inactivity Timer may start after the end of a CORESET indicating a DCI transmission. For example, the DRX Inactivity Timer may start at the beginning of the first symbol after the end of the CORESET. In diagram 200, the DRX Inactivity Timer may start at position 298A, which is immediately after the end of CORESET 210 that indicates a DCI transmission. For example, the DRX Inactivity Timer starts at the beginning of the first symbol immediately after the end of CORESET 210.

In one implementation, the DRX Inactivity Timer may start at the end of a PDCCH having a DCI transmission. For example, the DRX Inactivity Timer may start at the beginning of the first symbol after the end of the PDCCH. In diagram 200, the DRX Inactivity Timer may start at position 298B, which is immediately after the end of PDCCH 212 having a DC transmission. For example, the DRX Inactivity Timer starts at the beginning of the first symbol immediately after the end of PDCCH 212.

In one implementation, the DRX Inactivity Timer may start after the end of the slot of data reception/transmission. For example, the DRX Inactivity Timer may start right after the end of the slot of data reception/transmission within the same slot. In diagram 200, the DRX Inactivity Timer may start at position 298C, which is immediately after the end of data reception/transmission 214. For example, the DRX Inactivity Timer starts at the beginning of the first symbol immediately after the end of data reception/transmission 214 within the same $slot_0$. It should be noted that DCI 220 indicates data reception/transmission 214 within the same $slot_0$ as DCI 220.

In one implementation, the DRX Inactivity Timer may start at the end of the slot having a DCI transmission. For example, the DRX Inactivity Timer may start at the beginning of the first symbol after the end of the slot containing a DCI transmission. In diagram 200, the DRX Inactivity Timer may start at position 298D, which is at the end of $slot_0$ containing DCI 220. For example, the DRX Inactivity Timer starts at the beginning of the first symbol immediately after the end of $slot_0$ containing DCI 220.

In one implementation, the DRX Inactivity Timer may start at the end of the subframe containing an end of a data reception/transmission. For example, the DRX Inactivity Timer may start at the beginning of the first symbol after the end of the subframe containing a completed data reception/transmission. In diagram 200, the DRX Inactivity Timer may start at position 298E, which is at the end of $subframe_1$ containing $slot_N$ with a completed data reception/transmission 218. For example, the DRX Inactivity Timer starts at the beginning of the first symbol immediately after the end of $subframe_1$ containing $slot_N$ with a completed data reception/transmission 218.

In one implementation, the DRX Inactivity Timer may start after the end of a consecutive-slot of data reception/transmission. For example, the DRX Inactivity Timer may start at the beginning of the first symbol after the end of data reception/transmission within a scheduled consecutive-slot data reception/transmission (e.g., at the end of the PDSCH). In diagram 200, the DRX Inactivity Timer may start at position 298F, which is immediately after the end of data reception/transmission 216. For example, the DRX Inactivity Timer starts at the beginning of the first symbol immediately after the end of data reception/transmission 216 within $slot_1$. In this implementation, DCI 220 indicates a consecutive-slot data reception/transmission, where the time interval for the data reception/transmission occupies multiple slots which are consecutive in time domain. For example, in diagram 200, the base station transmits DCI 220 indicating a data reception over a PDSCH over two consecutive slots, $slot_0$ and $slot_1$. Then, the DRX Inactivity Timer starts immediately after the end of the PDSCH at the end of the consecutive-slot data reception/transmission at position 298F. For example, the DRX Inactivity Timer starts at the beginning of the first symbol immediately after the end of data reception/transmission 216 within $slot_1$.

In one implementation, the DRX Inactivity Timer may start after the end of a cross-slot of data reception/transmission. For example, the DRX Inactivity Timer may start at the beginning of the first symbol after the end of data reception/transmission within a scheduled cross-slot data reception/transmission.

In diagram 200, the DRX Inactivity Timer may start at position 298G, which is immediately after the end of data reception/transmission 218 scheduled by DCI 222. For example, the DRX Inactivity Timer starts at the beginning of the first symbol immediately after the end of data reception/transmission 218 within slot. In this implementation, DCI 222 indicates a cross-slot data reception/transmission, where the data reception/transmission occupies a slot not immediately adjacent to $slot_1$ in time domain. For example, in diagram 200, the base stations transmit DCI 222 indicating a data reception over a PDSCH in $slot_N$. Then, the DRX Inactivity Timer starts immediately after the end of the PDSCH at the end of the cross-slot data reception/transmission at position 298G. For example, the DRX Inactivity Timer starts at the beginning of the first symbol immediately after the end of data reception/transmission 218 within $slot_N$.

During the time interval, in which the DRX Inactivity Timer is running, the UE may monitor PDCCH and/or CORESET configured by the base station (e.g., an eNB or a gNB). The DRX Inactivity Timer may be restarted if the UE is scheduled for data transmission/reception. In an implementation, the base station may explicitly or implicitly indicate whether to (re)start the DRX Inactivity Timer for each scheduling (DCI transmission) through a DCI. In another implementation, the DRX Inactivity Timer is not to (re)start when the base station schedules a new transmission/reception to the UE with a DRX Inactivity Timer skipping indication. In another implementation, the DRX Inactivity Timer is to (re)start when the base station schedules a new transmission/reception to the UE with a DRX Inactivity Timer trigger indication. In yet other implementations, the base station may configure a CORESET configuration specific DRX Inactivity Timer length. The minimal value of the DRX Inactivity Timer can be zero, which means that the UE can skip triggering the DRX Inactivity Timer for specific CORESET configurations configured by the base station.

Case 3: DRX Inactivity Timer Expiration Time

In LTE networks, a UE will switch to a short DRX cycle after a DRX Inactivity Timer expires. Since the DRX Inactivity Timer is triggered at the end of a subframe in which the UE receives a DCI indication, and the timer is counted by psf, the starting time and the expiration time are aligning with an edge of a subframe. Different from the LTE networks, 5G NR networks may support different slot lengths, and are more flexible on data scheduling and timer configurations. Thus, the DRX Inactivity Timer may expire at timing positions that do not align with the edges of a subframe.

While a DRX Inactivity Timer may have a time unit in milliseconds, the actual duration of the DRX Inactivity Time may be integer or floating values. Based on the frame structure and the various DRX Inactivity Timer start positions discussed in CASE 2 above, CASE 3 includes various DRX Inactivity Timer expiration positions. Furthermore, as the DRX Inactivity Timer may be configured with an integer ($T_{IA}^{INT}$) value or a floating ($T_{IA}^{FLT}$) value, the various DRX Inactivity Timer expiration positions will be discussed with reference to FIGS. 3A and 3B and FIGS. 4A and 4B, respectively, below.

Figure 3A:
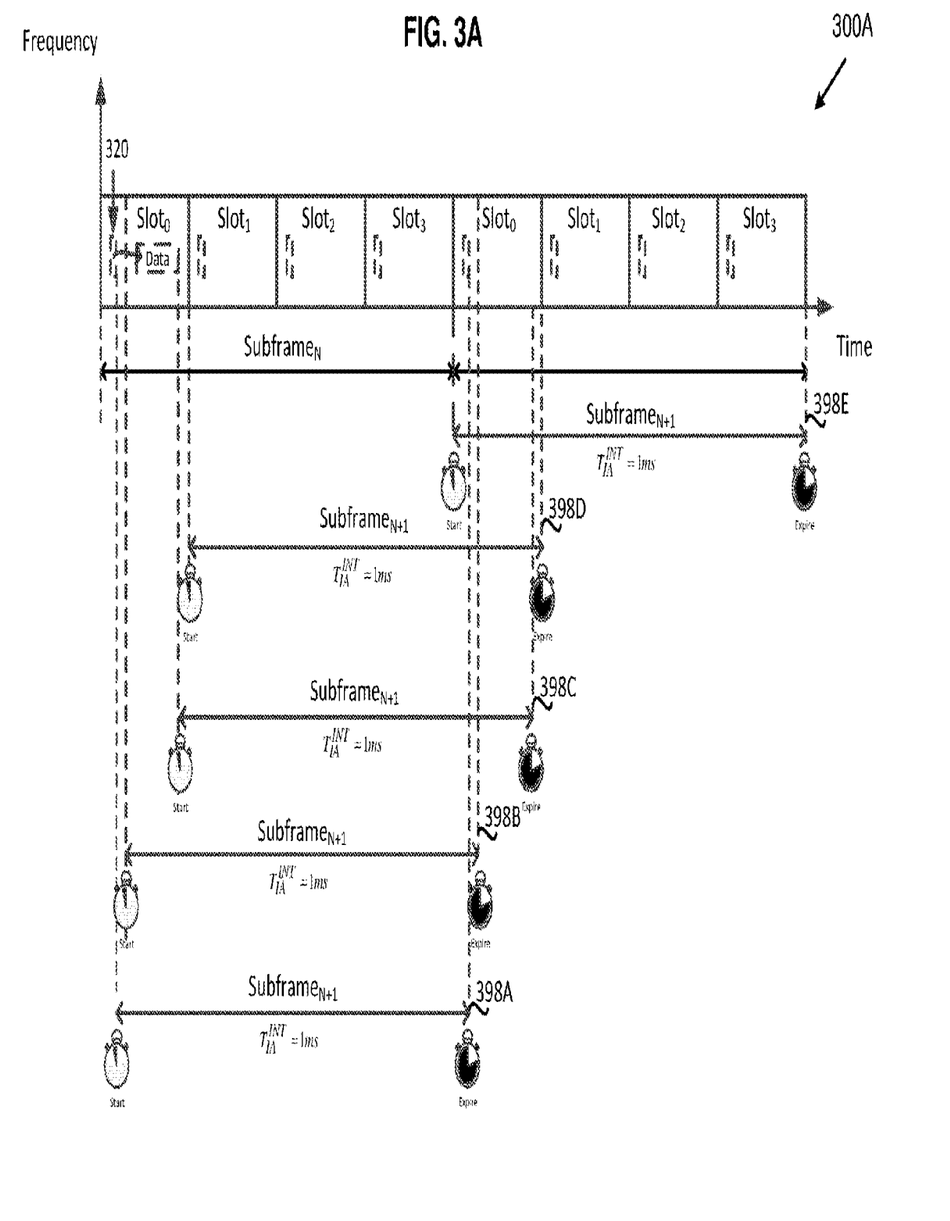
FIGS. 3A and 3B are diagrams illustrating subframe structures showing various DRX inactive timer expiration time positions configured with $T_{IA}^{INT}$, according to example implementations of the present application.
Figure 3B:
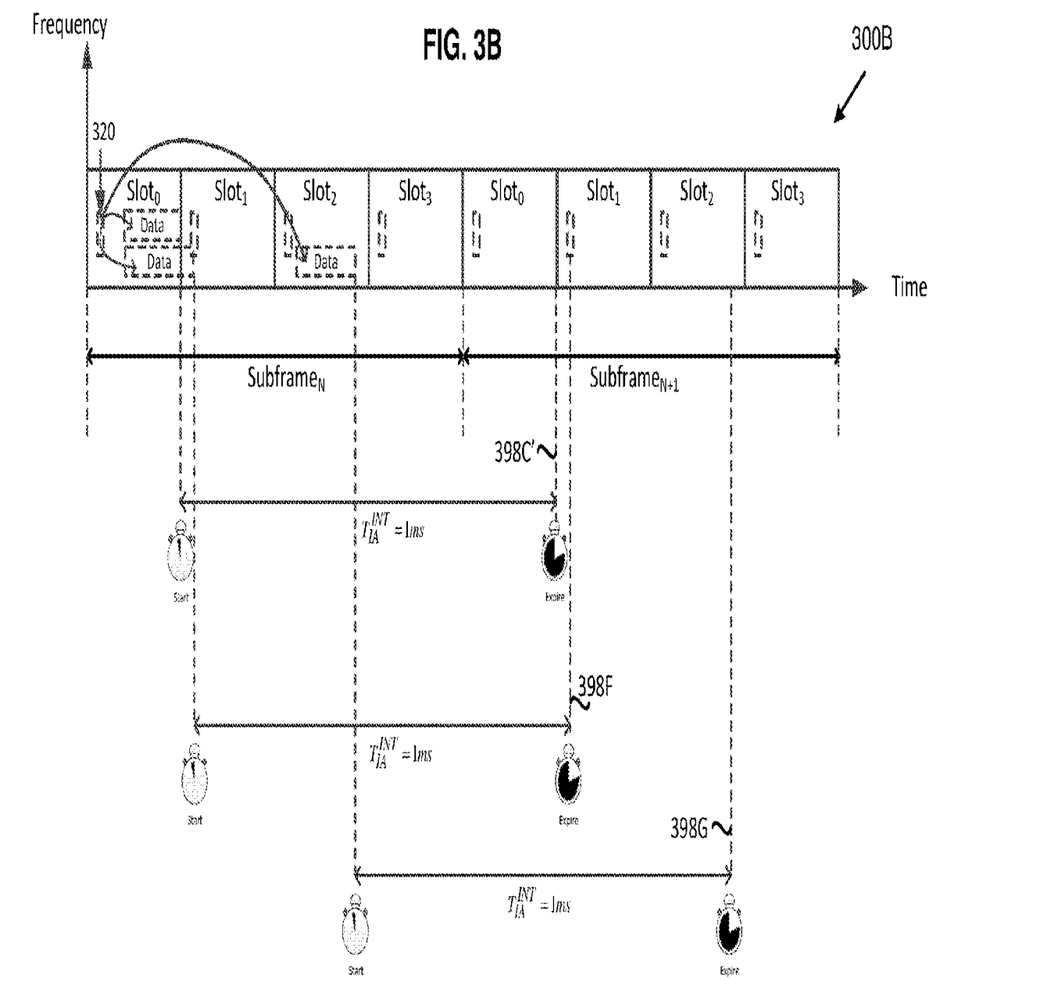

FIGS. 3A and 3B are diagrams illustrating subframe structures showing various DRX inactive timer expiration time positions configured with $T_{IA}^{INT}$, according to example implementations of the present application. In the examples illustrated in FIGS. 3A and 3B, a subframe includes four slots and a UE is configured by slot-based scheduling, such that the UE is configured to monitor CORESET within a PDCCH in each slot. The PDCCH can be at the beginning of each slot or semi-statically allocated anywhere within the slot by the base station for each slot. In the present implementation, with reference to FIGS. 3A and 3B, the PDCCH is allocated at the beginning of each slot and the DRX Inactivity Timer is configured with $T_{IA}^{INT}=1$ ms. It should be noted that the results may be different on different DRX Inactivity Timer configuration values. As shown in FIG. 3A, DC 320 for the UE is received in $slot_0$ of $subframe_N$. Based on the various starting time positions of a triggered DRX Inactivity Timer as discussed in CASE 2 above, there are several corresponding expiration time positions of the DRX Inactivity Timer, which is triggered by the DC 320.

In one implementation, the DRX Inactivity Timer may expire right after the end of a CORESET of $slot_0$ at $subframe_{N+1}$ (which is $T_{IA}^{INT}$ after the slot indicates a DC transmission), for example, at position 398A, as shown in FIG. 3A.

In one implementation, the DRX Inactivity Timer may expire at the end of a PDCCH of $slot_0$ at $subframe_{N+1}$ (a slot which is $T_{IA}^{INT}$ after the slot indicates a DCI transmission), for example, at position 398B, as shown in FIG. 3A.

In one implementation, where the DCI indicates that a data reception/transmission within same slot as the DCI transmission, the DRX Inactivity Timer may expire within a slot ($slot_0$ at $subframe_{N+1}$ (which is $T_{IA}^{INT}$ after the slot indicating a DCI transmission), for example, at position 398C, as shown in FIG. 3A.

In one implementation, where the DCI indicates that a data reception/transmission within same slot as the DCI transmission, the DRX Inactivity Timer may expire at the end of a slot ($slot_0$ at $subframe_{N+1}$ (which is $T_{IA}^{INT}$ after the slot indicating a DCI transmission)), for example, at position 398C', as shown in FIG. 3B.

In one implementation, the DRX Inactivity Timer may expire at the end of a slot (e.g., $slot_0$ in $subframe_{N+1}$ (which is $T_{IA}^{INT}$ after the slot indicating a DCI transmission), for example, at position 398D, as shown in FIG. 3A.

In one implementation, the DRX Inactivity Timer may expire at the end of a subframe (e.g., $subframe_{N+1}$ (which is $T_{IA}^{INT}$ after the subframe indicating the DCI transmission)), for example, at position 398E, as shown in FIG. 3A.

In one implementation, where the DCI indicates a consecutive-slot data reception/transmission (e.g., $slot_0$ and $slot_1$ of $subframe_N$), the DRX Inactivity Timer may expire within a CORESET (e.g., $slot_1$ of $subframe_{N+1}$), for example, at position 398F, as shown in FIG. 3B.

In one implementation, where the DCI indicates a cross-slot data reception/transmission (e.g., $slot_0$ and $slot_2$ of $subframe_N$), the DRX Inactivity Timer may expire within a slot (e.g., in $slot_1$ of $subframe_{N+1}$), for example, at position 398G, as shown in FIG. 3B.

For positions 398C, 398C', 398F, and 398G, the expiration time of the DRX Inactivity Timer depends on the length of the data reception/transmission. In other words, when the DRX Inactivity Timer starts right after the end of the data reception/transmission, the expiration time of the DRX Inactivity Timer depends on the length of the data reception/transmission, as illustrated in FIGS. 3A and 3B.

Figure 4A:
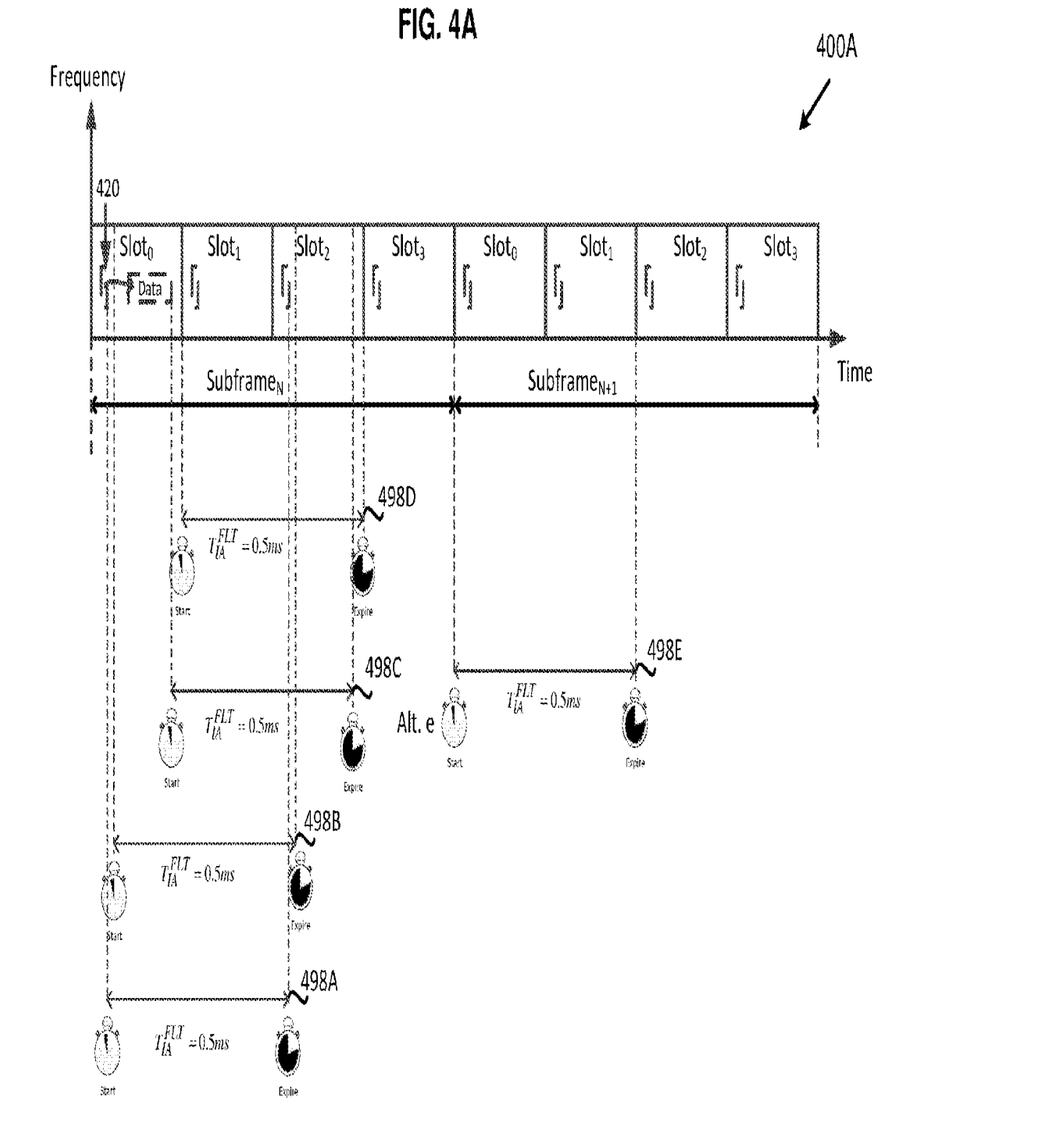
FIGS. 4A and 4B are diagrams illustrating subframe structures showing various DRX inactive timer expiration time positions configured with $T_{IA}^{FLT}$, according to example implementations of the present application.
Figure 4B:
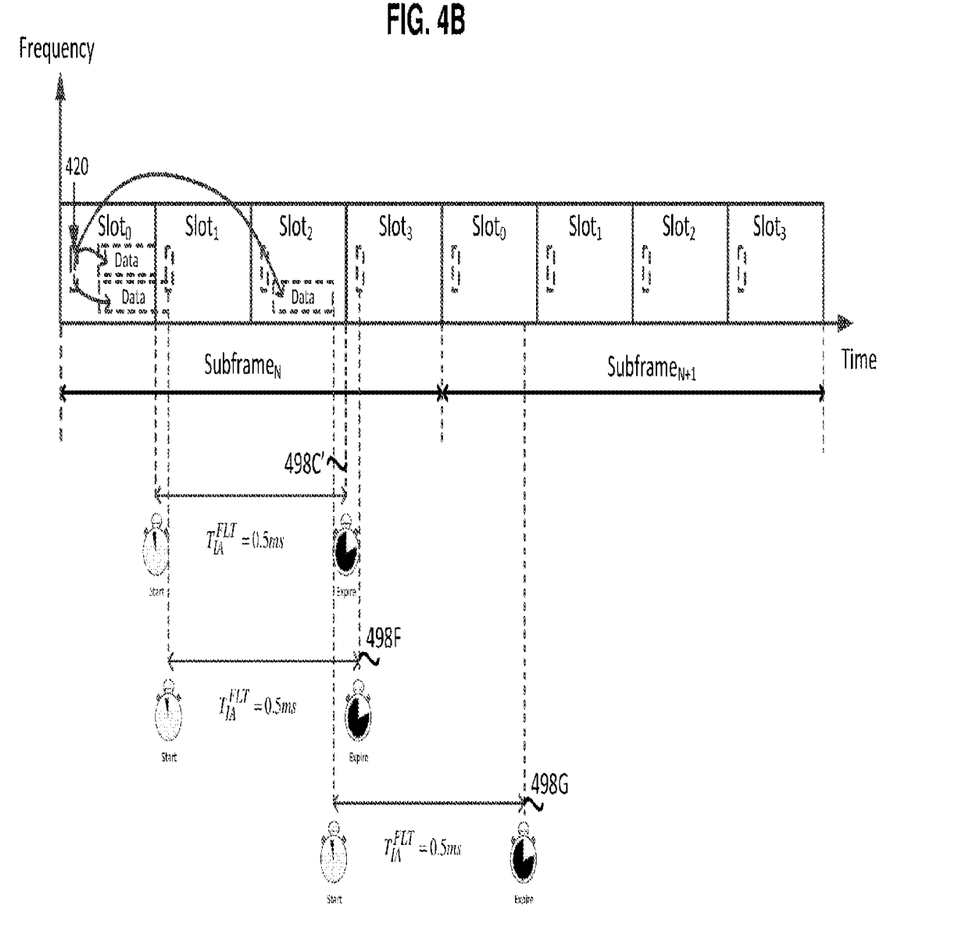

FIGS. 4A and 4B are diagrams illustrating subframe structures showing various DRX inactive timer expiration times configured with $T_{IA}^{FLT}$, according to example implementations of the present application.

In the present implementation, with reference to FIGS. 4A and 4B, the DRX Inactivity Timer is configured $T_{IA}^{FLT}=-0.5$ ms. It should be noted that the results may be different on different DRX Inactivity Timer configuration values. As shown in FIG. 4A, DCI 420 for the UE is received in $slot_0$ of $subframe_N$. Based on the various starting time positions of a triggered DRX inactivity Timer as discussed in CASE 2 above, there are several corresponding expiration time positions of the DRX Inactivity Timer, which is triggered by the DCI 420.

In one implementation, the DRX Inactivity Timer may expire right after the end of a CORESET in $slot_2$ at $subframe_N$ (a slot which is $T_{IA}^{FLT}$ after the slot indicating a DC transmission), for example, at position 498A, as shown in FIG. 4A.

In one implementation, the DRX Inactivity Timer may expire at the end of a PDCCH of $slot_2$ at $subframe_N$ (a slot which is $T_{IA}^{FLT}$ after the slot indicates a DCI transmission), for example, at position 498B, as shown in FIG. 4A.

In one implementation, where the DCI indicates that a data reception/transmission within same slot as the DCI transmission, the DRX Inactivity Timer may expire within a slot ($slot_2$ at $subframe_N$ (which is $T_{IA}^{FLT}$ after the slot indicating the DC transmission), for example, at position 498C, as shown in FIG. 4A.

In one implementation, where the DCI indicates that a data reception/transmission within same slot as the DCI transmission, the DRX Inactivity Timer may expire at the end of a slot (slot$_2$ at subframe$_N$ (which is $T_{IA}^{FLT}$ after the slot indicating the DCI transmission), for example, at position 498C, as shown in FIG. 4B.

In one implementation, the DRX Inactivity Timer may expire at the end of a slot (e.g., slot$_2$ in subframe$_N$ (which is $T_{IA}^{FLT}$ after the slot indicating a DCI transmission), for example, at position 498D, as shown in FIG. 4A.

In one implementation, the DRX Inactivity Timer may expire at the end of a slot (e.g., slot$_1$ in subframe$_{N+1}$ (which is $T_{IA}^{FLT}$ after the slot indicating a DCI transmission), for example, at position 498E, as shown in FIG. 4A.

In one implementation, where the DCI indicates a consecutive-slot data reception/transmission (e.g., slot$_0$ and slot$_1$ of subframe$_N$), the DRX Inactivity Timer may expire within a CORESET (e.g., slot$_3$ of subframe$_N$), for example, at position 498F, as shown in FIG. 4B.

In one implementation, where the DCI indicates a cross-slot data reception/transmission (e.g., slot$_0$ and slot$_2$ of subframe$_N$), the DRX Inactivity Timer may expire within a slot (e.g., in slot$_0$ of subframe$_{N+1}$), for example, at position 498G, as shown in FIG. 4B.

For positions 498C, 498C', 498F, and 498G, the expiration time of the DRX Inactivity Timer depends on the length of the data reception/transmission. In other words, when the DRX Inactivity Timer starts right after the end of the data reception/transmission, the expiration time of the DRX Inactivity Timer depends on the length of the data reception/transmission, as illustrated in FIGS. 4A and 4B.

CASE 4: UE Behavior Upon Expiration of the DRX Inactivity Timer

Figure 5:
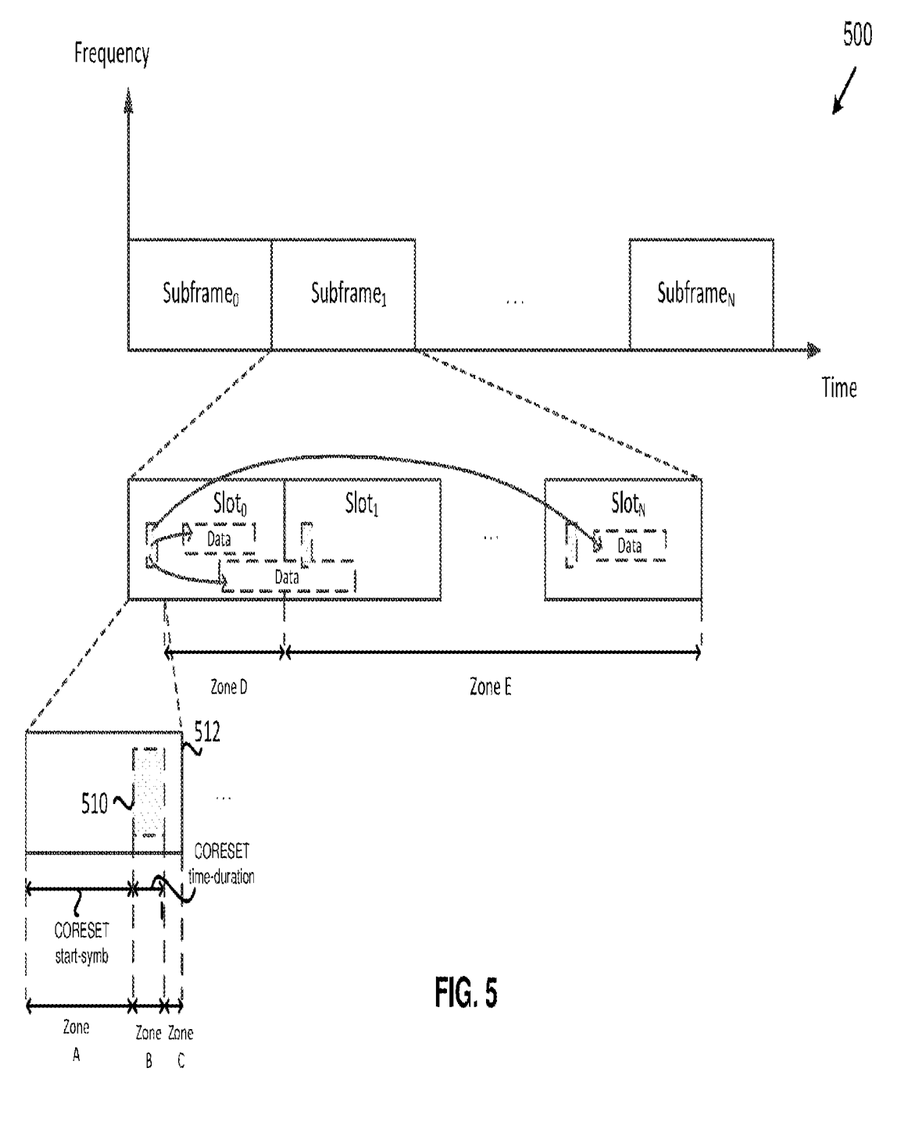
FIG. 5 is a diagram illustrating a subframe structure showing various time intervals for expiration of DRX inactive timers, according to example implementations of the present application.

FIG. 5 is a diagram illustrating a subframe structure showing various time intervals for expiration of DRX inactive timers, according to example implementations of the present application.

In diagram 500, zone A is the time interval in slot$_0$ before the appearance of CORESET 510. Zone A starts from the beginning of slot$_0$ and ends at the beginning of CORESET 510. The length of this time interval is (CORESET-start-symb)*symbol length.

In diagram 500, zone B is the time interval of CORESET 510. The length of this time interval is (CORESET-time-duration)*symbol length.

In diagram 500, zone C is the time interval of a PDCCH which occurs after the appearance of CORESET 510. It means that zone C starts from the end of the CORESET and ends at the end of PDCCH 512. The length of this time interval is the length of the PDCCH minus time lengths of zones A and B.

In diagram 500, zone D is the time interval of a slot, after the PDCCH, which starts from the end of PDCCH 512 and ends at the end of slot$_0$, wherein slot$_0$ is the same including the DCI received by the UE.

In diagram 500, zone E is the time interval of slots, excluding slot$_0$ having the PDCCH, which starts from the end of slot$_0$ and ends at the end of slot$_N$.

For the case of zone A, the UE can be configured to stop PDCCH/CORESET monitoring at the following possible timings:
1. the end right after the DRX Inactivity Timer expired;
2. the end of previous slot;
3. the end of the CORESET of this slot;
4. the end of this PDCCH;
5. the end of this slot;
6. the end of this slot if the UE is configured with a CORESET configuration for non-slot-based scheduling and this slot includes the CORESET for the non-slot-based scheduling;
7. the end of this slot if this slot includes other CORESET(s);
8. the end of this subframe;
9. the end of this subframe if the LIE is configured with a CORESET configuration for non-slot-based scheduling and this subframe includes the CORESET for the non-slot-based scheduling;
10. the end of this subframe if this subframe includes other CORESET(s).

For the case of zone B, the UE may be configured to stop PDCCH/CORESET monitoring at the following possible timings:
1. the end of the CORESET of this slot;
2. the end of this PDCCH;
3. the end of this slot;
4. the end of this slot if the UE is configured with a CORESET configuration for non-slot-based scheduling and this slot includes the CORESET for the non-slot-based scheduling;
5. the end of this slot if this slot includes other CORESET(s);
6. the end of this subframe;
7. the end of this subframe if the UE is configured with a CORESET configuration for non-slot-based scheduling and this subframe includes the CORESET for the non-slot-based scheduling;
8. the end of this subframe if this subframe includes other CORESET(s).

For the case of zone C, the UE can be configured to stop PDCCH/CORESET monitoring at the following possible timings:
1. the end of this PDCCH;
2. the end of this slot;
3. the end of this slot if the UE is configured with a CORESET configuration for non-slot-based scheduling and this slot includes the CORESET for the non-slot-based scheduling;
4. the end of this slot if this slot includes other CORESET(s);
5. the end of this subframe;
6. the end of this subframe if the UE is configured with a CORESET configuration for non-slot-based scheduling and this subframe includes the CORESET for the non-slot-based scheduling;
7. the end of this subframe if this subframe includes other CORESET(s).

For the case of zones D and E, the UE can be configured to stop PDCCH/CORESET monitoring at the following possible timings:
1. the end of this slot;
2. the end of this slot if the UE is configured with a CORESET configuration for non-slot-based scheduling and this slot includes the CORESET for the non-slot-based scheduling;
3. the end of this slot if this slot includes other CORESET(s);
4. the end of this subframe;
5. the end of this subframe if the UE is configured with a CORESET configuration for non-slot-based scheduling and this subframe includes the CORESET for the non-slot-based scheduling;
6. the end of this subframe if this subframe includes other CORESET(s).

It should be noted that although FIGS. 1, 2, and 5 illustrate that CORESETs 110, 210, and 510 are contained in PDCCHs 112, 212, and 512, respectively, in other implementations, that CORESETs 110, 210, and 510 may contain resource (e.g., time and frequency) allocation information that allows a UE to locate PDCCHs 112, 212, and 512, respectively. In such a case, CORESETs 110, 210, and 510 may not be contained in PDCCHs 112, 212, and 512, respectively.

Figure 6:
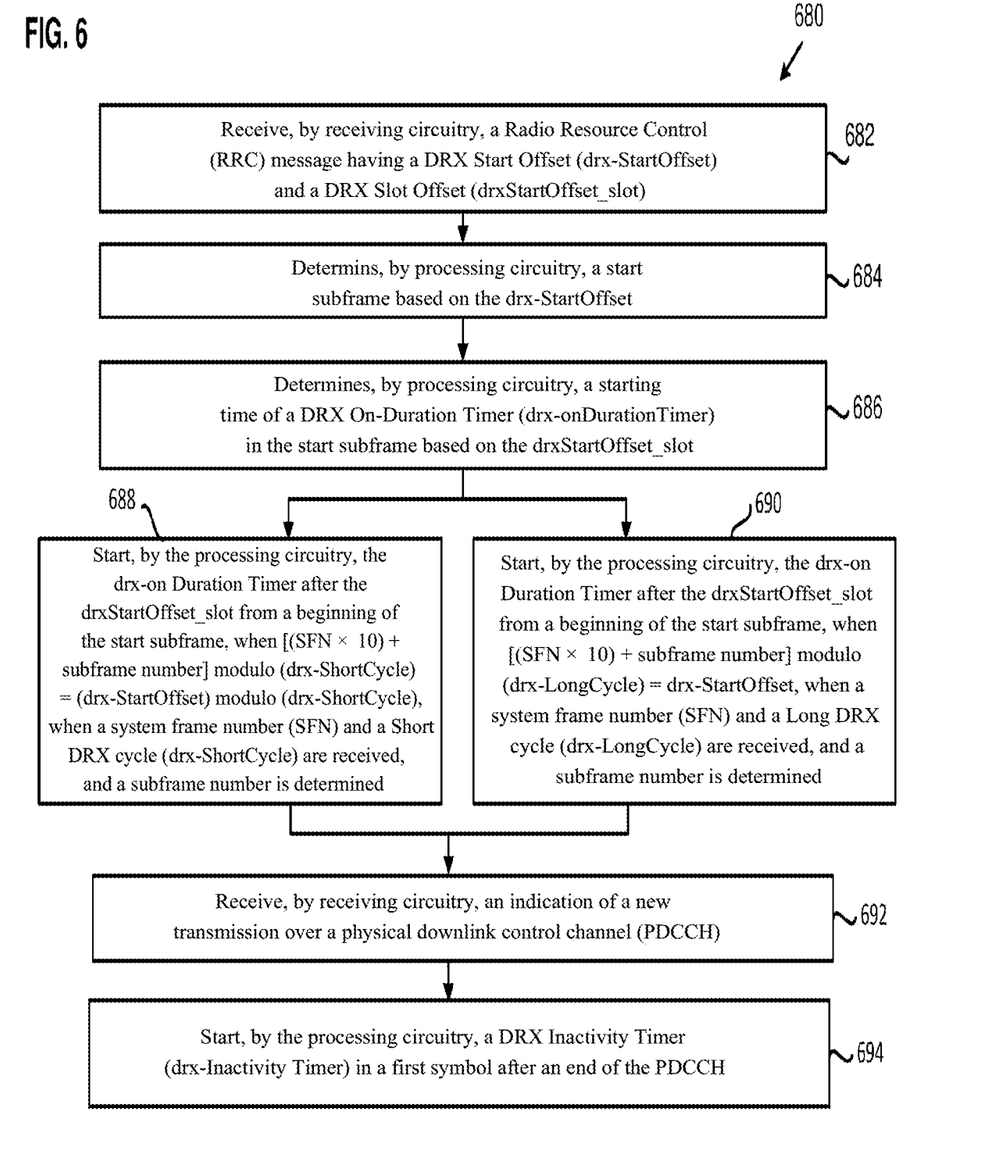
FIG. 6 is a flowchart illustrating a method by a UE for DRX operation, in accordance with an example implementation of the present application.

FIG. 6 is a flowchart of by a UE, according to an example implementation of the present application. In FIG. 6, flowchart 600 includes actions 682, 684, 686, 688, 690, 692, and 694.

In action 682, the UE receives, by receiving circuitry, a Radio Resource Control (RRC) message having a DRX Start Offset (drx-StartOffset) and a DRX Slot Offset (drxStartOffset_slot).

In action 684, the UE determines, by processing circuitry, a start subframe based on the drx-StartOffset.

In action 686, the UE determines, by processing circuitry, a starting time of a DRX On-Duration (drx-onDuration) Timer in the start subframe based on the drxStartOffset_slot.

In action 688, when a short DRX cycle is used, the UE starts, by the processing circuitry, the drx-on Duration Timer after the drxStartOffset_slot from a beginning of the start subframe, when ((SFN×10)+subframe number] modulo (drx-ShortCycle)=(drx-StartOffset) modulo (drx-ShortCycle), when a system frame number (SFN), a subframe number, and the Short DRX cycle (drx-ShortCycle) are received.

In action 690, when a long DRX cycle is used, the UE starts, by the processing circuitry, the drx-on Duration Timer after the drxStartOffset_slot from a beginning of the start subframe, when [(SFN×10)+subframe number] modulo (drx-LongCycle)=drx-StartOffset, when a system frame number (SFN), a subframe number, and the Long DRX cycle (drx-LongCycle) are received.

In action 692, the UE receives, by receiving circuitry, an indication of a new transmission over a physical downlink control channel (PDCCH).

In action 692, the UE starts, by the processing circuitry, a DRX Inactivity Timer (drx-Inactivity Timer) in a first symbol after an end of the PDCCH.

Figure 7:
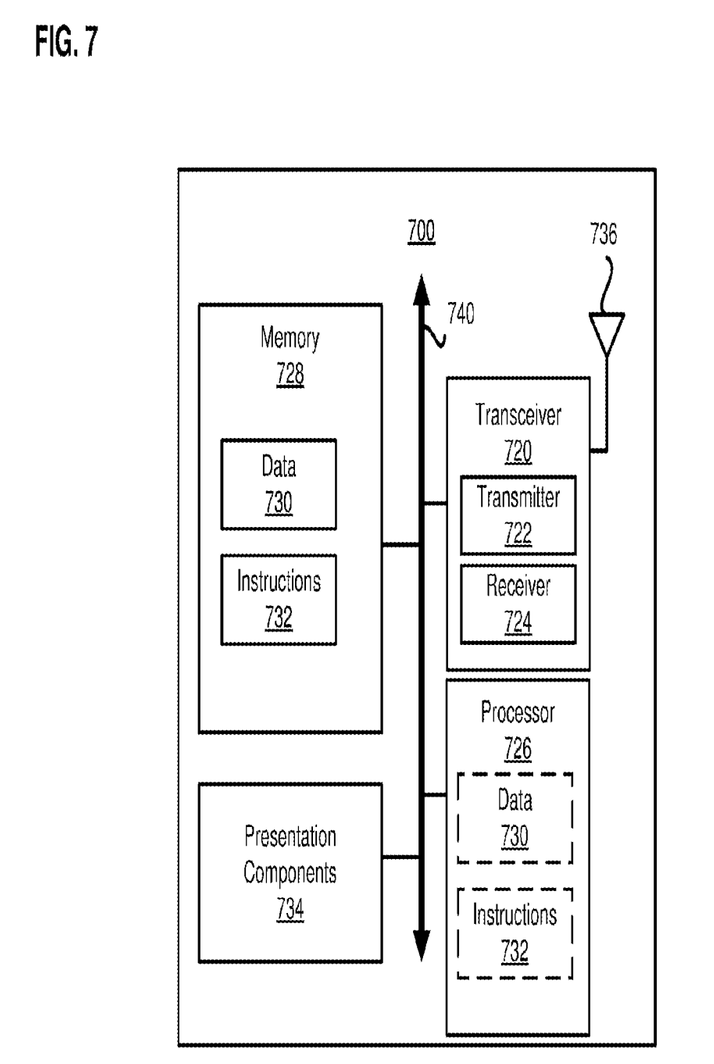
FIG. 7 is a block diagram illustrating a node for wireless communication, in accordance with an example implementation of the present application.

FIG. 7 illustrates a block diagram of a node for wireless communication, in accordance with various aspects of the present application. As shown in FIG. 7, a node 700 may include a transceiver 720, a processor 726, a memory 728, one or more presentation components 734, and at least one antenna 736. The node 700 may also include an RF spectrum band module, a base station communications module, a network communications module, and a system communications management module, input/output (I/O) ports, I/O components, and power supply (not explicitly shown in FIG. 7). Each of these components may be in communication with each other, directly or indirectly, over one or more buses 740. In one implementation, the node 700 may be a UE or a base station that performs various functions described herein, for example, with reference to FIGS. 1 through 6.

The transceiver 720 having a transmitter 722 (having transmitting circuitry) and a receiver 724 (having receiving circuitry) may be configured to transmit and/or receive time and/or frequency resource partitioning information. In some implementations, the transceiver 720 may be configured to transmit in different types of subframes and slots including, but not limited to, usable, non-usable and flexibly usable subframes and slot formats. The transceiver 720 may be configured to receive data and control channels.

The node 700 may include a variety of computer-readable media. Computer-readable media can be any available media that can be accessed by the node 700 and include both volatile and non-volatile media, and removable and non-removable media. By way of example, and not limitation, computer-readable media may include computer storage media and communication media. Computer storage media includes both volatile and non-volatile, removable and non-removable media implemented in any method or technology for storage of information, such as computer-readable instructions, data structures, program modules, or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not include a propagated data signal. Communication media typically embodies computer-readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared, and other wireless media. Combinations of any of the above should also be included within the scope of computer-readable media.

The memory 728 may include computer-storage media in the form of volatile and/or non-volatile memory. The memory 728 may be removable, non-removable, or a combination thereof. Exemplary memory includes solid-state memory, hard drives, optical-disc drives, etc. As illustrated in FIG. 7, the memory 728 may store computer-readable, computer-executable instructions 732 (e.g., software codes) that are configured to, when executed, cause the processor 726 (e.g., processing circuitry) to perform various functions described herein, for example, with reference to FIGS. 1 through 6. Alternatively, the instructions 732 may not be directly executable by the processor 726, but may be configured to cause the node 700 (e.g., when compiled and executed) to perform various functions described herein.

The processor 726 may include an intelligent hardware device, e.g., a central processing unit (CPU), a microcontroller, an ASIC, etc. The processor 726 may include memory. The processor 726 may process the data 730 and the instructions 732 received from the memory 728, and information through the transceiver 720, the baseband communications module, and/or the network communications module. The processor 726 may also process information to be sent to the transceiver 720 for transmission through the antenna 736, to the network communications module for transmission to a core network.

One or more presentation components 734 presents data indications to a person or other device. Exemplary presentation components 734 include a display device, speaker, printing component, vibrating component, etc.

From the above description, it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

What is claimed is:

1. A method performed by a user equipment, the method comprising:
   receiving a downlink control channel signal associated with a physical downlink control channel; and
   monitoring the physical downlink control channel for control-resource set (CORESET) information,
   wherein the CORESET information corresponds to time and frequency resource allocation information related to the physical downlink control channel, and
   the CORESET information includes at least one parameter related to a time duration of a CORESET.

2. The method of claim 1, wherein the time duration is a continuous time duration.

3. The method of claim 1, further comprising using data from an on-duration timer.

4. A communication apparatus comprising:
   a receiver configured to receive a physical downlink control channel signal; and
   a device configured to monitor the physical downlink control channel signal to detect control-resource set (CORESET) information,
   wherein the CORESET information includes at least one parameter related to a time duration of a CORESET and corresponds to time and frequency resource allocation information related to a physical downlink control channel.

5. The apparatus of claim 4, wherein the time duration is a continuous time duration.

6. The apparatus of claim 4, further comprising a processor, the processor configured to use data from a discontinuous reception inactivity timer.

7. The apparatus of claim 4, further comprising a processor, the processor configured to use data from an on-duration timer.

8. A base station apparatus comprising:
   a transmitter configured to transmit a physical downlink control channel signal including control-resource set (CORESET) information,
   wherein the CORESET information includes at least one parameter related to a time duration of a CORESET and corresponds to time and frequency resource allocation information related to a physical downlink control channel.

9. The base station apparatus of claim 8, wherein the time duration is a continuous time duration.

10. The base station apparatus of claim 8, wherein the transmitter is further configured to transmit multiple control-resource sets.

11. The base station apparatus of claim 8, wherein the transmitter is further configured to transmit data of a discontinuous reception inactivity timer.

12. The base station apparatus of claim 8, wherein the transmitter is further configured to transmit data of a discontinuous reception on-duration timer.

13. A method comprising:
   receiving a downlink control channel signal associated with a physical downlink control channel; and
   monitoring the physical downlink control channel for control-resource set (CORESET) information,
   wherein the CORESET information corresponds to time and frequency resource allocation information related to the physical downlink control channel, and
   the CORESET information includes at least one parameter indicating a location of a CORESET.

14. A communication apparatus comprising:
   a receiver configured to receive a physical downlink control channel signal; and
   a device configured to monitor the physical downlink control channel signal to detect control-resource set (CORESET) information,
   wherein the CORESET information includes at least one parameter indicating a location of a CORESET and corresponds to time and frequency resource allocation information related to a physical downlink control channel.

15. A method comprising:
   receiving a downlink control channel signal associated with a physical downlink control channel; and
   monitoring the physical downlink control channel for control-resource set (CORESET) information,
   wherein the CORESET information corresponds to time and frequency resource allocation information related to the physical downlink control channel, and
   the CORESET information includes at least one parameter related to a starting symbol for a CORESET.

16. The method of claim 15, wherein the at least one parameter further indicates a time duration of the CORESET.

17. The method of claim 16, wherein the time duration is a continuous time duration.

18. A communication apparatus comprising:
   a receiver configured to receive a physical downlink control channel signal; and
   a device configured to monitor the physical downlink control channel signal to detect control-resource set (CORESET) information,
   wherein the CORESET information includes at least one parameter related to a starting symbol for a CORESET and corresponds to time and frequency resource allocation information related to a physical downlink control channel.

19. The communication apparatus of claim 18, wherein the at least one parameter further indicates a time duration of the CORESET.

20. The communication apparatus of claim 19, wherein the time duration is a continuous time duration.

* * * * *